United States Patent [19]

Thorne

[11] Patent Number: 4,538,941

[45] Date of Patent: Sep. 3, 1985

[54] ROCK DUSTER APPARATUS

[75] Inventor: Gary H. Thorne, Colfax, W. Va.

[73] Assignee: National Mine Service Company, Pittsburgh, Pa.

[21] Appl. No.: 517,062

[22] Filed: Jul. 25, 1983

[51] Int. Cl.³ .............................................. B65G 53/40
[52] U.S. Cl. .................................. 406/143; 406/144; 406/153
[58] Field of Search ............... 406/118, 143, 144, 153; 51/436; 239/310, 318, 654, 655

[56] References Cited

U.S. PATENT DOCUMENTS

| | | | |
|---|---|---|---|
| 1,292,004 | 1/1919 | Miller | 406/144 X |
| 1,407,600 | 2/1922 | Stehli | 406/144 |
| 1,730,195 | 10/1929 | Davis | 406/153 X |
| 2,212,158 | 8/1940 | Plavin | 51/436 |
| 2,758,564 | 8/1956 | Randall | 406/144 X |
| 3,290,097 | 12/1966 | Hlinsky et al. | 299/80 |
| 3,306,676 | 2/1967 | Gurney | 406/120 |
| 3,333,896 | 8/1967 | Diamanti | 299/12 |

OTHER PUBLICATIONS

"Transeald Bulk Rockdusting System", by National Mine Service Co.

Primary Examiner—Jeffrey V. Nase
Attorney, Agent, or Firm—Stanley J. Price, Jr.

[57] ABSTRACT

A venturi section positioned in the flow path of pressurized air through a rock dust hopper includes an opening connected to a conduit extending to the axis of the venturi section. Concentric conduits within the venturi section direct the stream of pressurized air directly into intersecting relation with the conduit. The flow of pressurized air immediately below the conduit creates a reduced pressure to induce a continuous flow of rock dust through the venturi section opening and into mixture with the air stream which carries the entrained rock dust from the venturi section for discharge from a nozzle outlet.

9 Claims, 4 Drawing Figures

ROCK DUSTER APPARATUS

BACKGROUND OF THE INVENTION

1. Field of the Invention

This invention relates to rock duster apparatus and, more particularly, to a method of controlling the discharge rate of rock dust entrained in a stream of pressurized air from rock dust apparatus.

2. Description of the Prior Art

It is well known, in the mining of coal, that airborne coal dust, when accumulated in the mining atmosphere, presents a hazard of explosion and fire in the coal mine. Explosions of air-borne dust are known to result when a spark occurring in the operation, for example, of machinery at the working face, ignites a pocket of methane gas. A relatively harmless explosion of methane gas can cause a chain of larger coal dust explosions which can, in turn, generate a chain of increasingly larger explosions throughout the mine. It is now the standard practice, as federally regulated, to apply a thick layer of rock dust in the form of powdered limestone over exposed areas of the mine on the walls, roofs, floors and other areas of the mine up to a prescribed distance of the working face. Applying rock dust to these mine areas substantially eliminates the accumulation of airborne coal dust and reduces the danger of mine explosions caused by airborne coal dust.

It is the conventional practice to apply a layer of rock dust to the mine areas by the operation of rock dusting apparatus, which includes, preferably, a portable hopper containing the powdered limestone and an air compressor. The air compressor discharges a stream of air in which the powdered limestone becomes entrained. The stream of powdered limestone entrained in air is discharged from the nozzle of a hose connected to the hopper. The nozzle is directed at the surfaces of the mine roof, floor and walls to be covered.

U.S. Pat. No. 3,333,896 discloses a method and apparatus for rock dusting during coal mining operations to reduce the accumulation of coal dust generated at the mine face during the mining operation. Also, there is disclosed in this patent, the use of a portable rock duster movable to selected locations in a mine, such as at a return passageway, for settling out the rock dust generated at the mine face and carried by the ventilating air along the return passageway. The rock dust discharging unit is, therefore, positioned on the mining machine or positioned on a mobile frame for independent movement in the mine.

Each discharge unit is provided with a hopper-like bin for feeding rock dust through a gate into an injector feed pipe fitting. The gate includes a pipe that is angularly directed through an opening into the passageway of the feed pipe fitting toward the direction of the flow of air under pressure through the passageway.

At the point of injection of the pipe of the control gate into the feed pipe fitting is provided a constricted portion of the passageway. This constricted portion forms a venturi throat. Thus, air from the compressor is directed both into the hopper to agitate and separate the rock dust particles and also to continuously draw the rock dust from the hopper by the stream of air passing through the venturi throat. The rock dust becomes entrained in the air stream and is discharged as a gaseous suspension from a nozzle through which it is sprayed onto the walls, roof and floor areas of the mine.

It is also known in rock dusting apparatus to continuously draw the supply of rock dust from the hopper into an air supply line positioned in the hopper by utilizing a pipe having an area which is swedged down in diameter around an opening in the supply line to provide a venturi effect. This arrangement draws the rock dust into the air supply line. The air passing through the supply line in the constricted portion creates a reduced pressure at the opening for drawing the rock dust through the opening.

The efficiency of the rock dusting operation is determined to a great extent by the magnitude of the reduced pressure which can be generated in the air supply line or pipe in the rock duster hopper. The rock dust from the hopper is drawn into the air supply line so that the rock dust becomes entrained in the air stream and is carried from the supply line to the discharge nozzle. If the reduced pressure at the point of intersection between the flow of rock dust and air is insufficient, the amount of rock dust that becomes entrained in air will be insufficient to apply the desired layer of rock dust on the surfaces of the mine. Also, if the reduced pressure is insufficient, the opening into the air supply line can become blocked preventing the rock dust from entering the air supply line. Any obstruction in the opening to the air supply line is sufficient to reduce the amount of rock dust mixed with the air and to render the rock dusting operation ineffective.

Therefore, there is need, in rock dusting operations for apparatus which assures the continuous flow of rock dust from the hopper into mixture with the stream of air through the supply line from which the air and rock dust is discharged at the desired discharge rate.

SUMMARY OF THE INVENTION

In accordance with the present invention, there is provided rock duster apparatus that includes a support frame having an upper surface. A hopper for storing rock dust is positioned on the support frame upper surface. The hopper has an inlet opening and an outlet opening. The inlet and outlet openings are oppositely positioned. Means is provided for supplying a preseleted flow of pressurized air to the hopper. Control means is provided for controlling the means for supplying the preselected volume of air. Conduit means extending from the control means through the hopper inlet opening directs pressurized air from the control means into the hopper. A first conduit is positioned in the hopper and has an outlet end extending through the hopper outlet opening and an inlet end positioned adjacent the conduit means in the hopper. The first conduit has a passageway extending between the outlet and the inlet openings. The first conduit has an opening positioned between the outlet end and the inlet end. A second conduit is positioned in the first conduit opening and extends downwardly into the first conduit passageway. The second conduit has an inlet end and an outlet end. The outlet end is positioned in the first conduit passageway. A third conduit is positioned in the first conduit passageway and extends through the first conduit inlet end to the second conduit. Means is provided for supporting the third conduit coaxially in the first conduit passageway. The third conduit has an inlet end connected to the conduit means and an outlet end positioned oppositely of the second conduit outlet end. The third conduit has a passageway therethrough. The second conduit outlet end is positioned oppositely of the third conduit outlet end such that the flow of pressurized air through the first conduit passageway creates a reduced pressure in the second conduit passageway for continuously drawing rock dust from the hopper through the second conduit and into the first conduit for mixture with the pressurized air and conveyance with the flow of pressurized air out of the hopper outlet opening.

The second conduit is positioned entirely within the passageway of the first conduit and is welded to the first conduit so that the passageway through the second conduit is positioned 90° relative to the passageways of both the first and third conduits. The diameter of the second conduit is less than the diameter of the first conduit, and the length of the second conduit is such that, when it is welded in position in the first conduit, the second conduit extends to the axis of the first conduit.

The outlet end of the third conduit is angularly directed in the direction of air flow through the third conduit and the first conduit. In one example, an edge of the third conduit at the outlet end thereof abuts the second conduit above the outlet end thereof. The third conduit is positioned in the first conduit so that the axis of the third conduit is coaxial with the axis of the first conduit and is perpendicular to the axis of the second conduit. With this arrangement of angling and positioning the outlet end of the third conduit relative to the second conduit, the outlet end of the second conduit extends into the flow path of air through the third conduit.

Air passing through the third conduit contacts the outlet end of the second conduit. Positioning the outlet end of the second conduit in the flow path of air through the third conduit forms a venturi effect, reducing the pressure at the outlet end of the second conduit. Reducing the pressure at the outlet end of the second conduit continuously draws from the hopper a stream of rock dust which is admixed with the stream of pressurized air at the intersection of the outlet ends of the second and third conduits.

The rock dust entrained in the air stream is then conveyed through the passageway of the first conduit to the outlet end of the first conduit and therefrom through the outlet opening of the hopper. A hose or the like connected to the outlet opening of the hopper serves to control and direct the air entrained rock dust in a controlled stream at a preselected discharge rate.

Accordingly, the principle object of the present invention is to provide apparatus for controlling the rate of discharge of air entrained rock dust in a stream from a rock dust hopper.

Another object of the present invention is to provide rock dusting apparatus for use in mining operations to apply a preselected layer of rock dust on the floor, roof and walls of a mine by discharging rock dust entrained in a pressurized stream of air at a preselected rate and at a preselected volume from a hopper.

A further object of the present invention is to provide a method and apparatus for continuously drawing rock dust from a storage hopper into an air supply line by reducing the pressure at the intersection of the rock dust supply line and the air supply line so as to assure continuous conveyance and mixture of the rock dust with the pressurized air.

An additional object of the present invention is to provide venturi apparatus on a rock duster to assure continuous admixing of rock dust and pressurized air for discharge of the rock dust entrained in air at a preselected rate for rock dusting operations.

These and other objects of the present invention will be more completely disclosed and described in the following specification, the accompanying drawings and the appended claims.

DESCRIPTION OF THE PREFERRED EMBODIMENT

Figure 1:
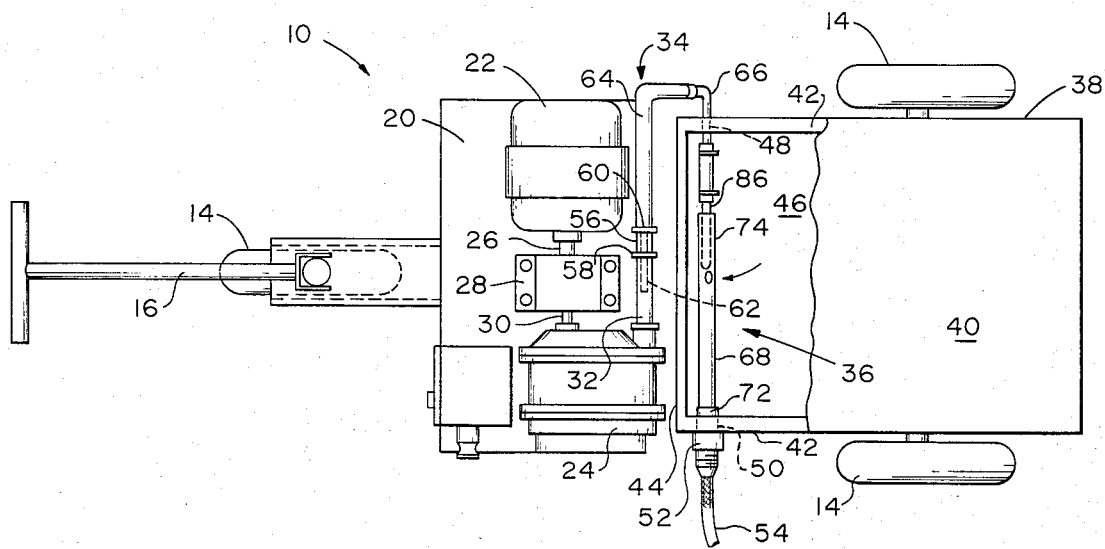
FIG. 1 is a top plan view of portable rock dusting apparatus adaptable for use in rock dusting operations in a mine, illustrating a motor for energizing a blower connected to an air supply line including a venturi section positioned in a rock dust hopper where rock dust is continuously drawn into the venturi section and admixed with the air for discharge from the hopper.
Figure 2:
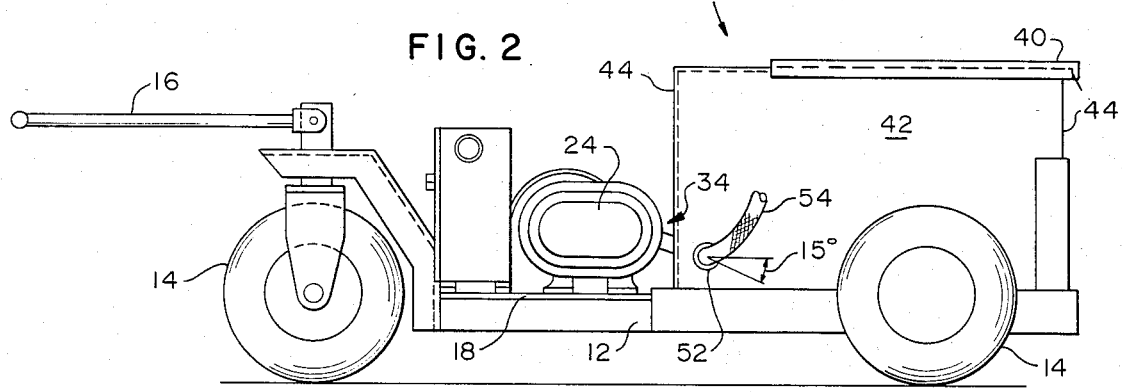
FIG. 2 is a view in side elevation of the rock dusting apparatus shown in FIG. 1.

Referring to the drawings and, particularly, to FIGS. 1 and 2, there is illustrated a portable rock dust apparatus generally designated by the numeral 10 for spraying the wall, roof, and floor surfaces of a mine with a layer of rock dust to suppress the circulation of airborne coal dust in the mine atmosphere. While FIGS. 1 and 2 illustrate portable apparatus, it should be understood that the present invention is also adaptable for mounting on operating equipment in a mine, for example, a mining machine, conveyor, locomotive, shuttle car and the like. The portable apparatus 10 illustrated in FIGS. 1 and 2 includes a support frame 12 mounted on wheels, such as rubbertired wheels. The frame 12 may also be mounted on the steel wheels to ride on rails. Thus, the frame 12 can either be incorporated with track machines, off-track machines, or a combination of both. The support frame 12 is mounted on a pair of rear wheels 14 and a single front wheel 14. Associated with the frame 12 at the front wheel 14 is a T-shaped handle 16 by which the apparatus 10 can be pulled to the desired location of operation in a mine. A suitable coupling can be substituted for the handle 16 for connection to a self-powered vehicle by which the rock dust apparatus is moved to desired locations in the mine.

The support frame 12 of the rock dust apparatus 10 has a substantially horizontal bed 18 having an upper surface on which is mounted an electric motor 22 and a blower or compressor 24. A motor, adaptable for use in the present invention, is a two horsepower, electrically driven A.C. motor. The motor 22 includes an output shaft 26 drivingly connected to a drive coupling 28 having an output shaft 30 drivingly connected to the blower 24. With this arrangement, rotation of the shaft 26 generated by the motor 22 is transmitted through the coupling 28 to the blower 24 for direct drive of the blower 24. The blower 24 is driven by the motor 22 to draw air into the blower 24 through an inlet conduit (not shown) and is discharged through an outlet conduit 32 at a preselected, volumetric rate, for example, 75 c.f.m.

As further illustrated in FIGS. 1 and 2, the output conduit 32 of the blower 24 is connected by an air supply line, generally designated by the numeral 34, to a venturi section, generally designated by the numeral 36, which is positioned in a hopper 38 mounted rearwardly of the motor 22 and blower 24 on the support frame 12. The hopper 38 has a bin-like construction which is removable from the support frame 12. The hopper 38 includes a lid 40 which is slidably positioned on a pair of upstanding side walls 42 and end walls 44. The walls 42 and 44, together with the lid 40, are removable from the support frame 12 to facilitate cleaning of the hopper 38, and servicing the other components on the rock duster apparatus 10.

The walls 42 and 44, with the lid 40, define a sealed chamber 46. For purposes of illustration in FIGS. 1 and 2, a portion of the lid 40 has been broken away to better illustrate a portion of the chamber 46, but it should be understood that the chamber 46 is completely enclosed so as to contain a suitable supply of rock dust, in the form of powdered limestone. The chamber 46 is also connected in a manner known in the art to the blower 24 to receive pressurized air directly into the chamber 46 for agitating the supply of rock dust contained in the chamber 46.

The hopper 38 includes an inlet opening 48 in one of the side walls 42 and an opposite outlet opening 50 in the other side wall 42. The air supply line 34 extends through the inlet opening 48 and is connected in the chamber 46 to the venturi section 36. The venturi section 36 is connected to a discharge coupling that extends through the hopper outlet opening 50. A flexible conduit 54 is connected to the discharge coupling 52 externally of the hopper chamber 46. The flexible conduit 54 may be of a preselected length and include a suitable means at the end thereof, such as a nozzle, for discharging the rock dust, entrained in an air stream, upon the exposed surfaces of the mine.

Air under pressure from the blower 24 is discharged through the output conduit 32 to the air supply line 34. The flow of air from the output conduit 32 to the air supply line 34 is controlled by a valve 56, such as a ball valve. The valve 56 has an inlet 58 connected to the output conduit 32 and an outlet 60 connected to the air supply line 34. The valve 56 includes an actuator by which the flow passage through the valve is controlled for, in turn, controlling the volumetric flow rate of pressurized air to the air supply line 34. Preferably, the air supply line 34 includes a flexible conduit 64, such as a rubber hose having an inside diameter of about 1.25 inches. The valve 56 is thus operable through the actuator 62 to either increase or decrease the volumetric flow rate through the air supply line 34.

The flexible conduit 64 is connected to a second conduit 66 that extends through the inlet opening 48 of the hopper 38. The opposite end of the conduit 66 extends into a chamber 46 for connection to the venturi section 36. Suitable coupling devices are provided for connection of the coduits 64 and 66 to each other and the conduit 66 to the venturi section 36.

Figure 3:
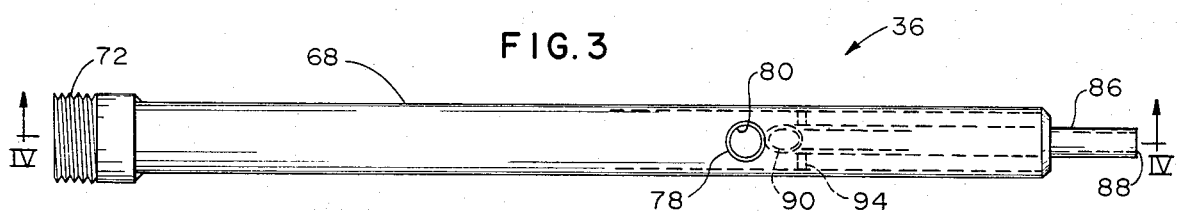
FIG. 3 is an enlarged fragmentary view of the venturi section of the rock dusting apparatus shown in FIGS. 1 and 2, illustrating a pair of concentric conduits intersecting a third conduit, at which point a venturi effect is created for the admixture of rock dust and pressurized air.
Figure 4:
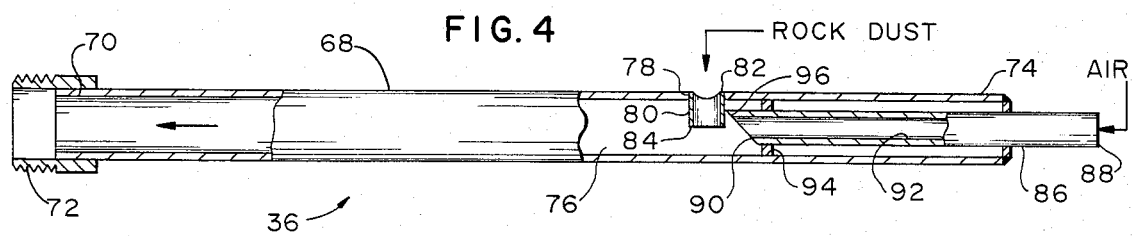
FIG. 4 is an enlarged, fragmentary, sectional view taken along line IV—IV of FIG. 3, of the venturi section, illustrating the arrangement of conduits for generating a venturi effect in the admixing of rock dust and pressurized air.

Now referring to FIGS. 3 and 4, the venturi section 36 of the rock dust apparatus 10 is illustrated in greater detail and includes a first, enlarged conduit 68 having an outlet end 70 with a fitting 72 for a threaded connection with the discharge coupling 52 that extends through the side wall 42 of the hopper 38. At the opposite end, the first conduit 68 has an inlet end 74, positioned adjacent to the conduit 66 of the air supply line 34 that extends through the opposite hopper sidewall 42. The first conduit 68 includes a passageway 76 extending from the inlet end 74 to the outlet 70.

The conduit 68 has a preselected wall thickness through which is provided an opening 78. A second conduit 80, preferably having a $\frac{3}{8}$ inch diameter, extends into the opening 78 and is welded to the first conduit 68. The second conduit 80 has an inlet end 82 flush with the outer surface of the first conduit 68 and an outlet end 84 extending a preselected length downwardly into the passageway 76, as shown in FIG. 4.

A third conduit 86 is positioned in the passageway 76 between the first conduit inlet end 74 and the second conduit 80. The third conduit 68 also has an inlet end 88 and an outlet end 90. The inlet end 88 extends out of the passageway 76 and is connected to the conduit 66 of the air supply line 34. The third conduit 86 also includes a passageway 92 that extends from the inlet end 88 to the outlet end 90.

The conduit 86 is maintained in coaxial relationship with the conduit 68 by the provision of a pair of bushings. Each of the bushings has an opening therethrough corresponding to the outer diameter of the conduit 86. One of the bushings 94 is welded to the conduit 68 at the inlet end 74 and the other bushing 94 is welded in surrounding relation to the third conduit 86 adjacent the outlet end 90. With this arrangement, the third conduit 86 is maintained in fixed, coaxial relation with the conduit 68 and is longitudinally fixed in the passageway 76.

The outlet end 90 of the third conduit 86 has an angular configuration so that the end of the conduit 86 is angularly directed toward the outlet end 84 of the second conduit 80 in the direction of air flow from the air supply line 34. Preferably, the outlet end 90 is positioned to contact the second conduit 80 at a contact point 96, shown in FIG. 4, which is perpendicular to the longitudinal axis of the conduit 80. The contact point 96 of the conduit 86 with the conduit 80 is approximately at the midpoint of the conduit 80. With this arrangement, the axis of the conduit 86 is approximately on a line with the outlet end 84 of the second conduit 80. The outlet end 84, thus lies approximately on the axis of the passageway 92 through the conduit 86. The second conduit 80 extends downwardly into the path of air flow through the conduit 86. In an operative embodiment of the present invention, for example, the conduit 80 has an inner diameter of approximately $\frac{3}{8}$ inch, and the conduit 86 has an inner diameter of approximately $\frac{1}{2}$ inch. The relationship between the conduits 80 and 86 and the means for mounting the conduits 80 and 86 in the passageway 76 assures that, as air under pressure flows through the conduit 86 into the passageway 76, a reduced pressure is created at the outlet end 84 of the conduit 80. The reduced pressure is effective to continuously draw the rock dust from the chamber 46 through the opening 78 and the conduit 80 into the passageway 76 where it is mixed with the air being conveyed through the passageway 76. The magnitude of the reduced pressure is regulated by operation of valve 56.

The rock dust becomes entrained in the flow of air which passes from the passageway 76 and out of the hopper 38 through the discharge coupling 52 and into the flexible conduit 54. A stream of rock dust at a preselected volumetric rate is discharged onto the exposed mine surfaces. Accordingly, with the present invention, the venturi effect that is created assures continuous flow of rock dust into the conduit 68. The reduced pressure created at the outlet end 84 is sufficient to prevent blockage of the opening 78 for efficient operation of the rock dust apparatus 10.

The magnitude of the reduced pressure generated at the opening 78, through which the rock dust is drawn, is controlled by operation of the valve 56. Turning the valve actuator 62 to increase the opening through the valve 56 increases the volume of air under pressure flowing through the venturi section 36. This increases the volume of rock dust drawn into the venturi section 36. Accordingly, by reducing the opening through the valve 56, a reduced amount of air under pressure is supplied to the venturi section 36 thereby reducing the venturi effect to decrease the amount of rock dust drawn into the venturi section 36. The rate of discharge of the rock dust entrained in air from the flexible conduit 54 is less reduced.

In an operative embodiment of the present invention, the valve 56 is regulated to provide a discharge rate of rock dust entrained in air between about 0.5 lbs. per minute to about 5.0 lbs. per minute. Thus, the amount of rock dust discharged from the flexible conduit 54 is determined by the operative position of the valve 56.

As illustrated in FIG. 2, the discharge coupling 52 and the venturi section 36 are positioned at a preselected elevation above the bottom of the hopper 38 to assure that large or caked particles of rock dust do not become lodged between the venturi section 36 and the floor of the hopper 38. Further, as diagrammatically illustrated in FIG. 2, the first conduit 68 of the venturi section 36 is rotationally oriented so that the axis of the opening 78 through the conduit 68 is directed downwardly at an angle of approximately 15° from the horizontal, as opposed to being in alignment with the horizontal or perpendicular to the horizontal. This orientation of the opening 78 prevents direct, downward discharge of the rock dust into the opening 78, which would normally tend to clog, and possibly completely block, the opening 78. However, by orienting the axis of the opening 78 at a preselected angle, for example 15°, the rock dust does not fall directly into the opening 78 but is drawn continuously into the opening 78. By positioning the opening 78 in this manner, the larger particles tend to roll off the conduit 68 as opposed to falling directly into the opening 78. This arrangement prevents blockage of opening 78 and elimination of the venturi effect.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Rock duster apparatus comprising,
a support frame having an upper surface,
a hopper for storing rock dust positioned on said support frame upper surface,
said hopper having an inlet opening and an outlet opening, said inlet and outlet openings being oppositely positioned,
means for supplying a preselected flow of pressurized air to said hopper,
control means for controlling the means for supplying a preselected flow of air,
conduit means extending from said control means through said hopper inlet opening for directing pressurized air from said control means into said hopper,
a first conduit positioned in said hopper and having an outlet end extending through said hopper outlet opening and an inlet end positioned adjacent said conduit means in said hopper,
said first conduit having a passageway extending between said inlet and outlet ends,
said first conduit having an opening positioned between said inlet and outlet ends,
a second conduit positioned in said first conduit opening and extending upwardly into said first conduit passageway,
said second conduit having an inlet end and an outlet end, said outlet end being positioned in said first conduit passageway,
a third conduit positioned in said first conduit passageway and extending through said first conduit inlet end to said second conduit,
means for supporting said third conduit coaxially in said first conduit passageway,
said third conduit having an inlet end connected to said conduit means and an outlet end,
said third conduit outlet end being postioned at an angle with respect to the axis of said first conduit passageway in the direction of flow of the pressurized air through said third conduit,
said third conduit having a passageway threrethrough, and
said third conduit outlet end abutting said second conduit at a contact point a preselected distance above said second conduit outlet end such that the flow of pressurized air through said third conduit past said second conduit outlet end creates a reduced pressure in said second conduit for continuously drawing rock dust from said hopper through said second conduit and into said first conduit for mixture with pressurized air out of said hopper outlet opening.

2. Rock duster apparatus as set forth in claim 1 in which,
said first conduit opening is positioned at a preselected angle with respect to a horizontal plane extending through the longitudinal axis of said first conduit.

3. Rock duster apparatus as set forth in claim 1 in which,
said third conduit abuts said second conduit at said contact point and is positioned perpendicular to said second conduit.

4. Rock duster apparatus as set forth in claim 3 in which,
said second conduit outlet end is positioned in the path of the pressurized air flowing from said third conduit outlet end.

5. Rock duster apparatus as set forth in claim 1 in which,
said third conduit outlet end is positioned at an angle of 45° with respect to the axis of said first conduit passageway and extends into abutting relation with said conduit at said contact point.

6. Rock duster apparatus as set forth in claim 1 in which, said means for supporting said third conduit coaxially in said first conduit passageway maintains the axis of said third conduit aligned with said outlet end of said second conduit.

7. Rock duster apparatus as set forth in claim 1 in which,
said means for supporting said third conduit coaxially in said first conduit passageway includes a pair of bushings positioned in surrounding relation with said third conduit,
one of said bushings being secured in said first conduit inlet end and secured in surrounding relation to said third conduit, and
the other of said bushings being secured in said first conduit passageway and secured in surrounding relation to said third conduit adjacent said outlet end thereof.

8. Apparatus for entraining particulate material in a stream of air comprising,
a first conduit having an inlet end and an outlet end with a passageway therethrough for directing a stream of air from said inlet end to said outlet end,
said first conduit having an opening into said passageway between said inlet and outlet ends,
a second conduit positioned in said first conduit opening and extending upwardly into said first conduit passageway,
a third conduit positioned in said first conduit passageway and extending through said first conduit inlet end to said second conduit,
means for supporting said third conduit coaxially in said first conduit passageway,
said third conduit having an inlet end for receiving a stream of air and a passageway therethrough, and
said third conduit having an outlet end abutting said second conduit at a contact point a preselected distance above said second conduit outlet end such that the flow of air through said third conduit and past said second conduit outlet induces a reduced pressure in said second conduit for continuously drawing particulate material into said first conduit opening and through said second conduit and into said first conduit for mixture with the stream of air and conveyance out of said first conduit outlet end.

9. A method for entraining particulate material in a stream of air comprising the steps of,
supplying a stream of air to an inlet end of a first conduit,
conveying the stream of air along an axial path to a preselected point in the first conduit,
supplying particulate material into the first conduit along a preselected path through a second conduit to a discharge point in the first conduit which is positioned in the axial path of the stream of air in the first conduit,
confining the direction of movement of the particulate material from the second conduit into the first conduit along the preselected path which is perpendicular to the path of the stream of air in the first conduit,
positioning the outlet end of a third conduit in the first conduit at the discharge point of the particulate material into the first conduit so that the flow path of the stream of air from the third conduit is in a direct line with the outlet end of the second conduit,
directing the stream of air at the discharge point to create a reduced pressure at the point where the particulate material is discharged from the second conduit and is applied to the first conduit,
reducing the pressure at the discharge point by the flow of pressurized air from the first conduit past the discharge point through the third conduit to induce a continuous flow of particulate material through the discharge point into the first conduit, and
entraining the flow of particulate material in the stream of air for conveyance out of the first conduit.

* * * * *